Oct. 26, 1954    E. E. SAVAGE    2,692,607
FLOW PROPORTIONING DEVICE
Filed Nov. 22, 1950    2 Sheets-Sheet 1

Edgar E. Savage
INVENTOR.
BY James M. Clark
HIS PATENT ATTORNEY.

Oct. 26, 1954

E. E. SAVAGE 2,692,607

FLOW PROPORTIONING DEVICE

Filed Nov. 22, 1950

Edgar E. Savage
*INVENTOR.*

BY *James M. Clark*

HIS PATENT ATTORNEY.

Patented Oct. 26, 1954

2,692,607

UNITED STATES PATENT OFFICE 2,692,607

FLOW PROPORTIONING DEVICE

Edgar E. Savage, Hawthorne, Calif., assignor to
North American Aviation, Inc.

Application November 22, 1950, Serial No. 197,123

12 Claims. (Cl. 137—99)

This invention relates in general to the control and regulation of the flow of fluids and more particularly to an improved means for controlling and proportioning the flow within two separate fluid lines.

In the operation of aircraft it is extremely desirable in many cases that the weight of the consumable and disposable loads be kept balanced and controlled within relatively close limits in order to prevent undesirable unbalance or disturbance to the trim of the aircraft due to shifting of its center of gravity. This is important in the control of the flow of the fuel from the tanks of relatively high-speed fighter aircraft and is particularly important in those airplanes in which the tanks are disposed at appreciable distances from the center of gravity of the aircraft. In the design of certain fighters of the jet propelled type, the requirement of providing large fuel storage capacity has frequently necessitated placing the tanks farther from the center of gravity, or C. of G., of the aircraft and numerous serious problems have been encountered due to this requirement. The relatively great fore and aft disposition or distance between these variable loads gives rise to the possibility of excessive shifting of the C. of G. in the aft direction in which condition the safety of the aircraft is seriously endangered and in certain extreme cases the aircraft is even rendered completely unflyable.

The present invention is directed to an improved liquid flow equalizer and proportioning device which equalizes or proportions the flow of liquid in two separate lines. The improved dual flow regulator device is particularly adapted for use with the fuel systems of such aircraft and other vehicles, and provides for the delivery of fuel from both the forward and the aft tanks simultaneosuly at a substantially equalized rate of flow, or a preselected ratio of rate of flow, whereby excessive C. of G. displacement is prevented. Due to a number of factors it has been found that frequently there is a greater tendency of one tank to be emptied, or the contents consumed by the power plant at a greater rate of flow, than the other, thereby resulting in a shift of the C. of G. toward the lagging or more slowly emptying tank. Such inequal flow rates may be contributed to by maneuvers through which the aircraft is caused to be flown, or due to abnormal flight attitudes, and it is also known that pumps having identical rated capacities frequently deliver inequal volumes of fluid or fuel due to slight differences resulting from manufacturing tolerances, all of which factors may tend to permit a gradual shifting of the C. of G. which may become sufficient to cause a critical condition of the airplane. This invention is accordingly directed to a fluid proportioning device by which the flow of a fluid through each of a pair of conduits or fluid circuits is closely controlled and likewise is directed to the control or equalization of the fuel flow from two or more tanks in order that the C. of G. of the aircraft is maintained as closely as possible at a predetermined desired location.

The present invention comprises essentially a flow equalizer device of a pressure differential variable orifice type having but a single moving balanced valve part or member which when rotated about its axis is capable of controlling the flow in each of two separate lines. A pair of matched Venturi tubes are disposed in the respective lines which compare the flows therein by transmitting pressures from the respective Venturi to the balanced rotatable moving part, the latter moving when an unbalanced pressure condition occurs to cut off the flow in the line in which the Venturi has sensed an increase in the rate of flow. The rotatable moving part when acted upon by the differential Venturi pressures, rotates about its axis to a position at which no unbalanced pressure remains to cause further rotation. The Venturi pressures again balance when one of the knife edges or blocking portions carried by the rotating member restricts the flow in one of the lines to the desired fraction of the total flow.

The improved device embodies a number of additional advantageous features which contribute materially to its efficient operation, its inherent flexibility of adjustment and suitability to various installations, and its desirable features which restore the full flow area in each of the lines in the event of failure of one of its parts or of other portions of the fluid system within which it is installed. One of its unique features embodies a centering arrangement exposed to each fluid line pressure in such manner that if either of these pressures should fall below a predetermined value, the corresponding one of a pair of centering devices automatically forces the rotating valve element to its central position in which it leaves both fluid lines wide open. The presently improved device also includes a check valve in each of the fluid lines which prevents reverse flow conditions and also insures that the higher of the line pressures does not reach the wrong portion of the device. The arrangement of the improved fluid proportioning device is also such that the Venturi elements are readily replaceable in order to either equally divide or proportion the relative flows in any predetermined proportion and provides for a straight-through flow thereby minimizing the resistance to the flow through the proportioning or regulating device.

It is, accordingly, a primary object of the present invention to provide a fluid flow equalizing or proportioning device for a pair of fluid conduits or lines, or for mixing or merging the contents of two conduits in any predetermined ratio. It is a corollary objective to provide such a fluid proportioning means for properly equalizing or proportioning the flow from tanks disposed in separated portions of an airplane in such manner that the discharge from said tanks does not cause a shift in the C. of G. of the aircraft. It is a further objective to provide such a regulating device in which the pressure drop across the device is relatively low such that under normal conditions, an additional load is not put on the fuel booster pumps; and also in the event the booster pumps, or the air pressure should fail, the device should not unduly oppose or prevent suction feed. A further objective of the invention resides in the provision of a flow equalizer which will not block one of the lines in the event the booster pump, or air pressure failure, causes the flow to stop in the other line.

It is a still further object of this invention to provide improved means for a flow regulating device of the present type wherein should one of its parts fail to operate properly, the device will not prevent fluid flow to the engine, but permits opening both of the lines for straight through flow. A further object resides in the provision of such a device which will operate satisfactorily at all extremes of pressure and temperature to which it might be subjected and in which the external leakage has been reduced to a minimum. A still further objective resides in providing such a device which will operate in any position or attitude and in which the weight, size, number of moving parts, maintenance and cost is also reduced to a minimum.

Further objects and advantages of the present invention will occur to those skilled in the art after reading the following description, taken in conjunction with the accompanying drawings, forming a part hereof, in which.

Figures 1, 4, 5, 6:
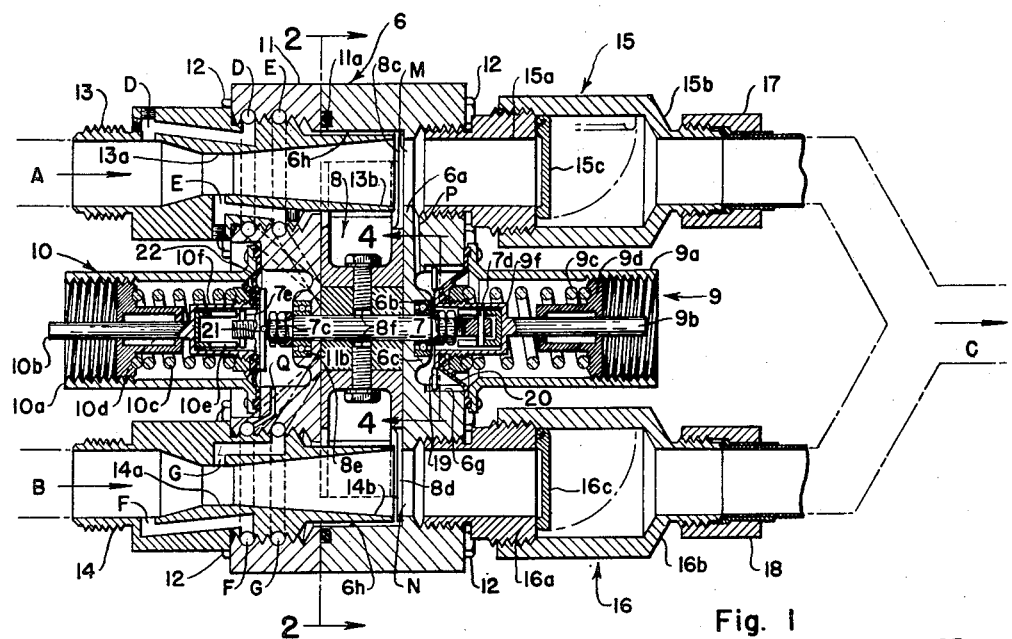
Fig. 1 is a longitudinal cross-sectional view of a form of the improved fluid proportioning device.
Fig. 4 is an enlarged transverse sectional view taken along the lines 4—4 of Fig. 1 showing the longitudinal guide means for one of the centering assemblies.
Fig. 5 is a detailed view of part one of the centering assemblies.
Fig. 6 is a typical arrangement of the improvement as installed in an airplane.

Referring to Fig. 1, the letter A represents a fluid line, the flow in which is intended to be maintained equal to that within the corresponding line B. The fluid line A may preferably be the fuel discharge line from a forward fuel tank in an aircraft such as shown in Fig. 6 and the line B may preferably be the fuel line from an aft tank, the disposition of the tanks and their capacities being such that it is desirable that they discharge at equal rates in order that one tank does not lag sufficiently behind the other to cause the center of gravity of the aircraft to shift in the direction of the lagging or heavier tank. In a conventional aircraft fuel system, it will be understood that booster pumps may be provided in each of the lines A and B and that a fuel pump to the engine or power plant will be provided on the outlet side of the device in the common line C. It should be understood, however, that the present device is not restricted to use in fuel systems, or even to aircraft, but that it has quite general applicability to use in any system in which the flow rates in two lines are either to be equalized or proportioned in a predetermined relationship, or in which the flow from a single line is either equalized or proportioned into two lines.

Returning now to Fig. 1, the numeral 6 is a cylindrical supporting ring which is internally threaded at one end, is provided with a transverse web portion 6a and has an internal bore 6h open to its forward end. The web 6a serves to house the anti-friction bearing 6b within its hub portion 6c. The transverse web 6a is provided with diametrically opposed ports or orifices M and N which are axially aligned with the fluid lines A and B, respectively. The anti-friction bearing 6b, preferably of stainless steel, and the hub portion 6c, provides a low-friction rotatable support for the rear end of the central shaft or spindle 7 which is axially disposed with respect to the cylindrical supporting ring 6. A rotary balanced piston valve assembly 8 is fixed to and supported by the shaft 7 for rotation therewith and comprises upper and lower valve portions 8a and 8b, respectively, upon which are integrally formed the knife edge or valving portions 8c and 8d, respectively. The valve portions 8a and 8b are diametrically disposed on opposite sides of the axis of the shaft 7, being attached to the hub element 8e by means of the attachment screws 8f, the hub portion 8e being in turn fixedly supported upon the shaft 7 by means of the key 7a. The central supporting ring 6 is provided with the above mentioned accurately bored portion 6h within which the part-cylindrical end faces of the valve portions 8a and 8b rotate; clearances are provided around the rotary valve assembly 8 and inside the cylindrical bore 6h of the ring 6 such that all metal-to-metal contact is prevented and this clearance is such that leakage is reduced to a minimum. Diametrically opposed partitioning portions 6d and 6e extend across the device, being secured to the central supporting ring 6 by means of the attachment screws 6f.

It will, accordingly, be noted that the annular supporting ring 6 forms a cylindrical chamber or cylinder which is transversely divided into two semi-cylindrical portions by the partitioning members 6d and 6e, with the valve assembly capable of limited rotation in either direction about the central axis of the shaft 7 and within the cylindrical bore 6h of the ring 6. A first end of the cylindrical chamber within which the balance valve portions of the assembly 8 are rotatable, is formed by the web portion 6a and is closed in on the opposite side of the valve assembly 8 by the annular element 11 within which a further stainless steel bearing 11b is provided for the rotatable support together with the stainless steel ball-bearing 6b for the central shaft 7. The transverse joint between the ring portions 6 and 11 is sealed by the O-ring type seal 11a disposed within a suitable groove in the supporting ring 6, and the rings are fastened together by the attachment bolts 12. The central shaft 7 is provided at each end with a pair of retainer nuts 7c with suitable washers between the same and the ball-bearings 6b and 11b to maintain the axial position of the shaft 7 with respect to the hub portions of the two ring elements 6 and 11. The terminal portions of the shaft 7 are provided with transverse pins 7d and 7e by means of which the floating or rotatable valve assembly 8, and its attached shaft 7, may be returned to its central neutral position by means of the centering units 9 and 10, respectively, to be more fully described below.

Figure 2:
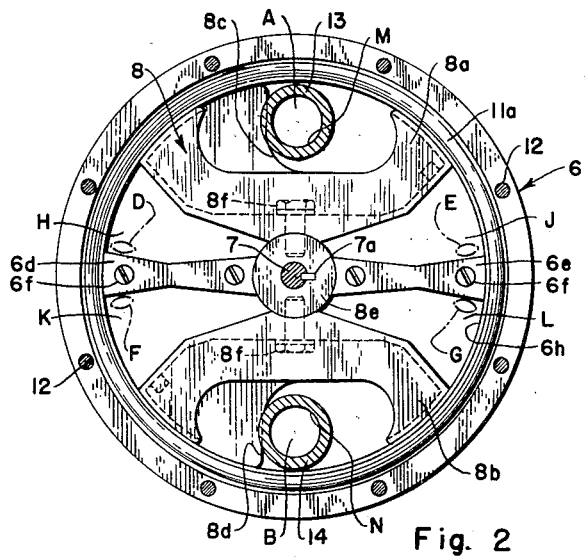
Fig. 2 is a transverse sectional view of the same as taken along the lines 2—2 of Fig. 1.

The end ring 11 is provided with a pair of diametrically oppositely disposed threaded apertures axially aligned with the above mentioned ports M and N in the supporting ring 6, and these threaded apertures are arranged to receive the Venturi units 13 and 14, aligned with the fluid lines A and B. The Venturi element 13 is externally threaded for connection to the fluid conduit A and is provided with a throat portion 13a and an exit portion 13b. The exit portion 13b extends across the valve chamber portion within the bore 6h and is aligned with, and terminates adjacent to, the circular port M in the web of the supporting ring 6, between which the knife edge portion 8c of the rotary piston valve assembly 8 is adapted to pass as the valve is rotated (clockwise in Fig. 2) from its neutral position. The pressure of the fluid entering the venturi is carried through the ducts or channels D into the valve chamber portion H as indicated in Fig. 2, above the transverse partition 6d and beneath the upper valve rotor portion 8a; and similarly the fluid pressure at the throat of the Venturi is carried through the ducts E into the chamber portion J on the opposite side of the cylinder, above the partition element 6e, also as shown in Fig. 2. Similarly the Venturi unit 14 is threadedly connected to the fluid line B and threadedly engages the ring portion 11 extending through the cylindrical valve chamber and terminating a short distance from the face of the web portion 6a of the supporting ring member 6, in alignment with the orifice N therein, and adjacent which the knife edge portion 8d is adapted to be rotated to cut off or to impede the flow through the aligned Venturi unit 14 and the orifice N. This Venturi unit 14 is similarly provided with a throat portion 14a and an exit portion 14b, with a duct F for transmitting fluid pressure from the inlet to the valve chamber portion K as indicated in Fig. 2, and a similar duct G is provided to transmit the throat pressure from the venturi to the corresponding space L on the opposite side of the valve chamber, also as indicated in Fig. 2.

On the outlet side of the orifice M an externally threaded nipple element 15a threadedly engages the supporting ring 6 and provides for the threaded attachment of the check valve unit 15 having a body portion 15b and a pivoted check valve element 15c. The outlet side of the orifice N is also provided with the similarly threaded nipple 16a threadedly engaging the supporting ring 6 and providing for the support of the check valve unit 16 comprising the valve housing 16b and its pivoted valve element 16c. The outlet of the check valve unit 15 is suitably engaged by the coupling 17 for the branch to the common conduit C, and a like coupling 18 engages the unit 16 for a similar connection.

The centering assembly 9 is shown in Figs. 1, 4 and 5 and comprises the flanged cylindrical housing portion 9a, suitably supported from the web portion 6a of the supporting ring 6, and has centrally supported therein the pin assembly 9b which is axially aligned with the adjacent end of the shaft 7 of the rotary valve unit 8. A duct or passageway P is provided radially within the web portion 6a of the support ring 6 for transmitting fluid pressure on the outlet side of the orifice M into a chamber defined by the hub portion 6a and the flexible diaphragm 20. The latter is urged toward the hub portion 6a by the compression spring 9c, the compression in which is adjusted by means of the adjusting nut 9d, through which the pin 9b is centrally guided. Movable with the flexible diaphragm 20 and serving to retain the same on the centering pin assembly 9b, is a circular disc 19 provided with a pair of outwardly radially extending pins 19a which are arranged to be guided longitudinally parallel to the central axis of the device and within the groove 6g formed within the web portion 6a of the supporting ring 6, as more particularly shown in Figs. 1 and 4. Carried within the casing sleeve 9f of the pin assembly 9b is a centering V-grooved element 9e. As this grooved element 9e is brought into engagement with the pin 7d of the shaft 7, the pin is caused to be rotated together with the shaft 7 about its axis such that the shaft and its attached rotary piston valve 8 is also rotated into its normal central position as shown in Fig. 2, in which both lines A and B and the outlets of the Venturi units 13 and 14 are open and unimpeded by the knife edge portions 8c and 8d of the rotary valve assembly 8. Accordingly, in the event the line pressure within the line A falls below a value predetermined by the adjustment of the nut member 9d as transmitted through the passageway P against the diaphragm 20 and opposed by the adjusted compression spring 9c, the spring overcomes the reduced pressure and the V-grooves 9e move inwardly against the transverse pin 7d, as shown in Fig. 5, and the rotary piston valve assembly 8 is automatically returned to its neutral central position in which both lines A and B are opened wide for full flow conditions.

Conversely, in the event the pressure within the other line B should drop below a predetermined valve as determined by the adjustment of the nut 10d of the centering unit 10, the fluid pressure which is transmitted through the duct F and tapped off by the duct Q into the chamber formed by the hub of the ring 11 and the diaphragm 22 becomes insufficient to oppose the compression spring 10c; and the pin assembly 10b accordingly moves inwardly toward the pin 7e, the corresponding V-grooves of the element 10e serving to rotate the shaft 7 and its attached piston-valve assembly 8 into its neutral central position in which both lines A and B are opened wide. The centering units 9 and 10 are substantially identical with each other, being arranged to work in opposite directions on the adjacent ends of the central shaft 7. The movable diaphragm portion of the centering unit 10 is also provided with a diaphragm retaining disc 21 having transverse pins which engage suitable grooves extending longitudinally within the ring portion 11 for preventing rotation of the pin assembly 10b and the attached V-guide element 10e, the housing portion 10f, the attached diaphragm 22 and its retaining disc and guide pin 21. The pin element 10b is similarly guided within the adjusting nut 10d, the latter threadedly engaging the interior wall of the housing 10a which is cylindrical and similarly flanged for attachment to the transverse web portion of the support ring 11, clamping the periphery of the diaphragm therebetween.

Reference to Fig. 5 shows a further improved form of the present device whereby either, or both, of the centering devices may be manually actuated; and this figure also shows an indicating means whereby the emptying of either tank can be signalled or otherwise brought to the pilot's attention. In this figure the pin or rod assembly 9b is provided with a roller 9g pivotally mounted at 9h at a bifurcated terminal of the rod 9b. A suitable hand lever 23 may be pivotally supported at 23a from the adjacent supporting structure and provided with a contacting face or boss 23b arranged to engage the roller 9g. The manual lever 23 may be centered by suitable springs 23c to maintain and return the same to its normal central position. For indicating the automatic, or manual, actuation of the centering means, a contactor element 9j may be adjustably clamped or mounted upon the rod 9b in such position that as the plunger 9b moves inwardly and the valve piston 8 and its shaft 7 are centered by the centering unit 9, the element 9j contacts the micro-switch 24, which may be supported from the housing 9a, and upon closing causes the indicating lamp 25 in circuit with a suitable power source and control switch to be lighted or otherwise energized for signalling to the pilot the fact that one of the tanks has either been emptied, or that the centering means has been either manually or automatically operated. In Fig. 1, both check valves 15 and 16 are shown in their closed positions with the centering device 9 shown actuated as a result of no flow or pressure in conduit A, but for illustrative purposes the centering device 10, which would also normally be actuated as a result of the lack of pressure in conduit B, is shown as it would appear if the rod 10b were pulled out manually against the pressure of the spring 10c.

The operation of the form of the present flow proportioning device as illustrated is as follows: The two Venturi units 13 and 14 are constructed so that they are matched with each other and for the same rates of flow they produce identical pressure differences between their inlets D and F, and their throats E and G, respectively. Accordingly, the pressures which are transmitted by these four passageways are very closely compared as they are connected to the chambers between the four faces of the balanced rotary piston valve 8 which comprises the single moving friction-free part of the flow proportioning device. Let us assume that the flow rate from the forward tank and its booster pump through the conduit A is suddenly increased above the flow rate passing through the conduit B. This will result in unbalanced pressures on the rotary piston valve assembly 8 caused by an increase in the pressure difference between the entrance to passageway D and the entrance to passageway E. This will have the effect of causing the pressure difference tending to rotate the valve assembly 8 in the clockwise direction as viewed in Fig. 2, to be greater than the pressure difference from the ducts F and G of the Venturi 14, with which they were previously balanced and equal, and which are tending to rotate the same in the opposite (or counterclockwise) direction. Accordingly, the clockwise rotation will cause the knife-edge portion 8c to pass between the exit 13b of the Venturi unit 13 and the orifice M, thereby reducing the flow through conduit A to such an extent that the balanced condition of the valve 8 is again restored.

Figure 3:
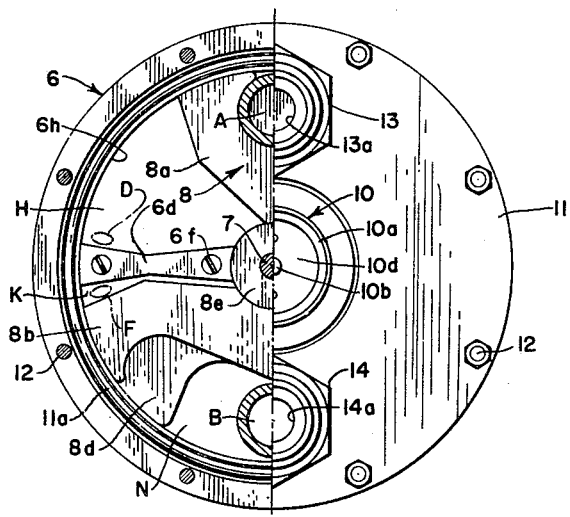
Fig. 3 is a part-sectional part-end view of the device as viewed in the same direction as Fig. 2.

It will be noted that the knife-edge portion 8d of the lower half of the valve rotor 8b rotates away from the opening of the conduit B as the upper opening A is gradually closed or blocked off. At the left side of Fig. 3, the corresponding cross-sectional view in the left half of this figure shows the valve rotor unit 8 rotated into an extreme clockwise position in which it substantially completely cuts off the flow through the conduit A while the flow through the conduit B is unimpeded. This is a case in which the flow through the conduit B has fallen to zero; so that the rotor unit 8 causes the flow through conduit A to fall to zero. In systems where zero flow through both conduits is undesirable, the corresponding pressure in conduit B for this condition would be such that centering assembly 10 comes into operation causing the rotor unit 8 to move to the neutral or centered position, leaving both fluid lines open. For this condition the check valve 16c prevents pressure in conduit A from being transmitted to centering assembly 10, and prevents flow from conduit A through conduit B in a reverse direction.

Conversely, excessive flow through the conduit B will cause a counterclockwise movement of the rotary valve piston 8, cutting off the flow through the orifice N while leaving the orifice M unimpeded. It will, accordingly, be seen that the Venturi pressures balance only when one of the knife-edges of the rotary piston valve unit 8 has restricted the flow in one of the lines to the desired fraction of the total flow at which a balanced condition of the valve piston rotor is again obtained. It will also be noted that the centering devices are separately exposed to each fuel line pressure through their respective passages P and Q in such manner that should the line pressure in either conduit fall below a predetermined value, the proper centering device exposed to that line pressure will force the rotary piston valve into its central position in which both lines are opened wide. At the same time the check valves 15 and 16 will prevent reverse flow and also insure that the high line pressure does not reach the wrong diaphragm.

While the disclosed form of the improved device has been directed to equalizing the flow within two conduits it will be understood that it is equally adapted to proportion the flows between a large and a small conduit by using different throat diameters for the respective Venturi units. The single moving part, namely, the rotary piston valve assembly 8 is exactly balanced, and the clearances around this part are preferably such that substantially all metal-to-metal contact and other friction is prevented, and yet the leakage is not excessive. It will also be noted that this single moving part is constrained only by the stainless ball-bearings 6b and 11b, this moving part acting like a piston while mounted on ball-bearings and having none of the sliding friction which is inherent in prior regulating devices of the piston and cylinder type.

It will also be understood that conventional orifices can be substituted for the Venturi units which have been disclosed. Another feature adding to the flexibility and ease of operation of the improved flow proportioning device is the speed with which it may be taken out of operation by the manual actuation of either of the plunger pins 9b or 10b of the respective centering devices 9 and 10, such as by the manual lever 23 shown in Fig. 5. The flow equalizer may also be forced to be moved into its neutral or centered position by turning off the booster pumps, or the air pressure momentarily.

The improved device has the further advantage that it provides for straight-through flow thereby meeting a desirable requirement in such devices that the pressure drop across the device be as low as possible. A second micro-switch and an individual signal may be provided for the remaining centering device in installations where it might be desirable that the pilot be notified which tank is emptied first. Rotor unit 8 is statically balanced weight-wise in any suitable manner, such as by machining, the addition of weights in appropriate places, or the like. It may be noted that any leakage from conduit A to conduit B passing rotor unit 8 will also be measured by the venturis so that accuracy of proportioning is not affected. This obtains for the reason that the venturis are upstream of rotor unit 8.

In installations where the flows are to be mixed or proportioned in other than a 1:1 ratio, Venturi units having throat diameters corresponding to the predetermined desired ratio may be substituted for those shown in the drawings without necessitating any other changes. The present device may also be utilized to equalize or proportion the flow of air as well as liquid and it will be understood that it is not necessary to join the outlets of the conduits A and B to a common conduit C.

Other forms and modifications of the present invention, both with respect to its general arrange and specific details, which may occur to those skilled in the art after reading the present description, are intended to come within the scope and spirit of this invention, as more particularly set forth in the appended claims.

I claim:

1. The combination with a device for controlling the ratio of the flows of fluids through two separate fluid conduits disposed in straight parallel paths through a unitary body of means disposed within each conduit for sensing pressure changes due to variations in the rates of flow in each said conduit, single unitary piston valve means pivotally mounted upon said body for rotation with respect thereto, said piston valve means having integral portions disposed within the path of the fluid in each said conduit, and means including pressure transmitting ducts interconnecting said flow sensing means with said piston valve means for initiating closing movement of the operating portion of said piston valve means in that conduit in which an increased flow rate is sensed by said flow sensing means.

2. Means for proportioning the flow rates of fluids through two conduits comprising a Venturi unit disposed within each said fluid conduit arranged to develop differential pressures in accordance with the flow rate of the fluid within each said conduit, a pressure-actuated rotary balanced valve means having operating portions arranged to rotate into and away from the paths of the fluid passing through each said conduit, and communicating means operatively interconnecting each said Venturi unit with said balanced valve means for initiating partial rotation of said valve means upon variations in said pressure differential for partial closing movement of the operating portion of the valve means in that conduit in which an increased flow rate is sensed by the Venturi unit within that conduit.

3. Automatic means for proportioning the flow rates of fluids through two conduits comprising a first Venturi unit disposed within the first said conduit, a second Venturi unit disposed within the second said conduit, said Venturi units arranged to develop differential pressures in accordance with the flow rate of the fluid flowing through each Venturi unit, a pressure-actuated rotary balanced valve means having integral portions arranged to rotate into and away from the fluid paths passing through each said conduit, and communicating means operatively interconnecting each said Venturi unit with said balanced valve means for initiating partial rotation of said valve means upon variations in said pressure differential for closing movement of the operating portion of the said valve means in that conduit in which an increased flow rate is sensed by the corresponding Venturi unit.

4. The combination with means for proportioning the flow rates of fluids through two separate conduits, of separate Venturi units disposed within each said conduit arranged to develop differential pressures in accordance with the flow rate of the fluids within each said Venturi unit, a differential pressure actuated rotary piston valve means having valving portions arranged to rotate into and away from the paths of the fluid passing through each said conduit, said piston valve means normally occupying an intermediate position of said valving portions and communicating means operatively interconnecting said Venturi unit with said balanced valve means for initiating partial rotation of said valve means upon variations in said pressure differential for closing movement of the operating portion of the said valve means in that conduit in which an increased flow rate is sensed by the corresponding Venturi unit.

5. A device for controlling the flow of fluids through two conduits comprising means for sensing variations in the rates of flow in each said conduit, variable orifice piston valve means having valving portions movable to positions within the fluid flow in each of said conduits, means operatively interconnecting said flow sensing means with said piston valve means for initiating closing movements of the valving portion of said piston valve means in that conduit in which an increased flow rate is sensed by said flow sensing means, a camming portion carried by said piston valve means, and cam means under the influence of the pressure in one of said conduits arranged for engagement with said camming portion to return said piston valve means to its neutral open position upon predetermined reduction in pressure within either said conduit.

6. In a device for proportioning the flow of fluids through two conduits, means for sensing variations in the rates of flow in each said conduit, piston valve means having portions rotatable into valving positions within each said conduit, pressure transmitting means operatively interconnecting said flow sensing means with said piston valve means for initiating valving of the flow in that conduit in which an increased flow rate is sensed by said flow sensing means, said piston valve means having a cam engaging portion, and spring-biased cam means arranged to automatically engage said valve means cam portion for the rotative return of said piston valve means to its neutral position upon predetermined reduction in fluid pressure within one of said conduits.

7. In a device for proportioning the flow of fluids flowing through two conduits, means for sensing variations in the rates of flow in each said conduit, piston valve means having portions rotatable into valving positions with respect to the flow in each said conduit, pressure transmitting means operatively interconnecting said flow sensing means with said piston valve means for initiating valving of the flow in that conduit in which an increased flow rate is sensed by said flow sensing means, said piston valve means having a centrally disposed cam engaging portion, spring-biased cam means under the influence of the pressure in one of said conduits arranged to engage said piston valve means cam portion to rotatively return said piston valve means to a neutral position upon predetermined reduction in pressure rate within either said conduit for increased flow through the other said conduit, manual means for overcoming said spring-biasing for the selective return of said piston valve means to said neutral position, and check valve means disposed within each said conduit for preventing the reverse flow of fluid pressure from one of said conduits into the other of said conduit.

8. In a device for proportioning the flow of fluids through two conduits, means for sensing variations in the rates of flow in each said conduit, a body member, piston valve means pivotally mounted upon said member having portions rotatable into valving positions within each said conduit, pressure transmitting means operatively interconnecting said flow sensing means with said piston valve means for initiating valving of the flow in that conduit in which an increased flow rate is sensed by said flow sensing means, said piston valve means having a cam engaging portion spring-biased cam means under the influence of the pressure in one of said conduits arranged to engage said piston valve means cam portion to automatically return said piston valve means to its neutral position upon predetermined reduction in flow pressure within either of said conduits, and manual means for overcoming said spring-biased cam means for the selective return of said piston valve means to said neutral position.

9. A flow control valve for an aircraft having fluid flow control requirements within separate flow paths for preventing shift in the center of gravity of the aircraft, said flow control valve comprising means of the pressure differential type for sensing variations in the rates of flow in each said flow path, rotary piston valve means having valving portions disposed within each said flow path, means operatively interconnecting said flow sensing means with said piston valve means for partially closing off the fluid flow within either of said flow paths from which an increased flow rate is sensed by said flow sensing means, automatic means under the influence of the fluid pressure in either of said flow paths for returning said piston valve means to a neutral position in which the fluid flow within both said flow paths is unimpeded by said piston valve means, and manual means including a pivotally mounted lever operatively connected to said automatic means for returning said piston valve means to said neutral position irrespective of the fluid pressures in said fluid flow paths.

10. In a device for regulating the ratio of the flows of fluids through two conduits, a body member, said conduits extending through said body member in substantially straight parallel paths, regulating means including a pressure differential element disposed within each said conduit for sensing variations in rates of flow therein, pressure communicating means associated with said flow sensing means arranged to transmit differential pressures therefrom, balanced piston valve means rotatively mounted upon said body member, said valve means having cut-off portions movable into the flow paths of each said conduit, said valve means arranged to be actuated by said differential pressures for initiating closing rotative movement of said cut-off portion within that conduit in which an increased flow rate is sensed by said flow sensing means, spring-biased cam means under the influence of the pressure of the fluid in said conduit arranged for operatively engaging said valve means for rotatively centering said valve means in the neutral position at which the flow through said conduits is uninterrupted, and manual means for overcoming said spring-biased cam means for the selective return of said piston valve means to said neutral position.

11. The combination with a device for regulating the ratio of the flows of fluids through two separate conduits, of means including a pressure differential creating element disposed within each said conduit for sensing variations in rates of flow in said conduits, communicating means associated with each said flow sensing means arranged to transmit differential pressures from said elements, pivotally mounted balanced piston type valve means having rotatable operating portions arranged to be rotated into and away from the flow within said conduits upon transmission of differential pressures through said communicating means as created in said elements for initiating closing rotational movement of said valve means within that conduit in which an increased flow rate is sensed by said flow sensing means for the regulation of the ratio of the flows of fluids in said conduits, and restoring means including a spring-loaded reciprocably mounted member in fluid communication with said conduits operatively engageable with said valve means initiated by a predetermined drop in the pressure of the fluid within either of said conduits to rotate said valve means to the neutral position in which both said conduits are fully opened.

12. A flow control valve for a fluid system for controlling the flow of fluids in separate conduits, said flow control valve comprising pressure differential means for sensing variations in the rates of flow in each of the conduits, rotary piston valve means having valving portions disposed within each of the conduits, pressure transmitting means operatively interconnecting said flow sensing means with said piston valve means for partially closing off the fluid flow within either of the conduits when an increased flow rate is sensed by said flow sensing means, and normally disengaged spring-biased centering means including a rotatively restrained reciprocating assembly in fluid communication with a first of the conduits for automatically engaging and rotating said piston valve means into its neutral position upon predetermined drop in pressure in the first of the conduits for the opening of the valving portion disposed within the other conduit.

References Cited in the file of this patent

UNITED STATES PATENTS

| Number | Name | Date |
| --- | --- | --- |
| 1,581,595 | Osborne | Apr. 20, 1926 |
| 2,466,485 | Schultz | Apr. 5, 1949 |
| 2,511,538 | Muller | June 13, 1950 |

FOREIGN PATENTS

| Number | Country | Date |
| --- | --- | --- |
| 488,924 | Great Britain | July 12, 1938 |